United States Patent

Ishiguro et al.

[11] Patent Number: 5,125,066
[45] Date of Patent: Jun. 23, 1992

[54] FIBER OPTICAL AMPLIFIER

[75] Inventors: Yoichi Ishiguro; Takashi Kogo; Masaharu Ooe, all of Yokohama; Yutaka Katsuyama, Mito, all of Japan

[73] Assignees: Sumitomo Electric Industries, Ltd., Osaka; Nippon Telegraph and Telephone Corporation, Tokyo, both of Japan

[21] Appl. No.: 554,535

[22] Filed: Jul. 19, 1990

[30] Foreign Application Priority Data

Jul. 20, 1989 [JP] Japan ............... 1-85417[U]

[51] Int. Cl.$^5$ .............................................. G02B 6/16
[52] U.S. Cl. ..................... 385/142; 385/27; 385/123; 385/128
[58] Field of Search ........... 350/96.11, 96.12, 96.13, 350/96.15, 96.16, 96.29, 96.30, 96.34; 372/6, 39, 40; 385/27–30, 123–128, 141, 142

[56] References Cited

U.S. PATENT DOCUMENTS

| | | | |
|---|---|---|---|
| 4,044,315 | 8/1977 | Snitzer | 372/40 |
| 4,693,545 | 9/1987 | Henningsen et al. | 350/96.12 |
| 4,815,079 | 3/1989 | Snitzer et al. | 372/6 |
| 4,847,843 | 7/1989 | Byron et al. | 372/6 X |
| 4,874,222 | 10/1989 | Vacha et al. | 350/96.34 |
| 4,959,837 | 9/1990 | Février et al. | 372/6 |
| 4,963,832 | 10/1990 | Desurvire et al. | 350/96.15 X |
| 4,964,694 | 10/1990 | Oohashi et al. | 350/96.34 X |

FOREIGN PATENT DOCUMENTS 0281222 9/1988 European Pat. Off.
2175760 12/1986 United Kingdom.

OTHER PUBLICATIONS

Shimada, "Impact of An Erbium Doped Optical Fiber Amplifier On A Light Communication System", pp. 75-82, Apr. 1989.

K. S. Kranz, et al., "Hermetically Coated Optical Fibers: Hydrogen Permeation and Fatique Properties", SPIE vol. 992 Fiber Optics Reliability: Benign and Adverse Environments II (1988), pp. 218-222.

Primary Examiner—John D. Lee
Attorney, Agent, or Firm—Cushman, Darby & Cushman

[57] ABSTRACT

The invention relates to an optical fiber in which an optically functioning element is doped in at least the core, and the cladding is hermetically coated with carbon film and an optical fiber-type optically active device comprising: an optical fiber loop bundle constituted by a plurality of winds of an optical fiber hermetically coated with carbon and doped with an optionally functioning element; and beam introducing means for introducing a beam for pumping the optically functioning element into the optical fiber loop bundle.

13 Claims, 6 Drawing Sheets

Fig.5

| TEST NO. | SURROUNDING ATMOSPHERE | | DURABIILITY (DAY) | |
|---|---|---|---|---|
| | TEMPERATURE (°C) | HUMIDITY (RH) | WITH CARBON COATING | WITHOUT CARBON COATING |
| 1 | 25 | 60 | ☆ | ☆ |
| 2 | 25 | 95 | ☆ | 60 |
| 3 | 50 | 60 | ☆ | 35 |
| 4 | 50 | 95 | ☆ | 12 |
| 5 | 75 | 60 | ☆ | 1.5 |
| 6 | 75 | 95 | ☆ | 0.5 |

FIBER OPTICAL AMPLIFIER

BACKGROUND OF THE INVENTION

1. Field of the Invention

This invention relates to an optical fiber and a device using the optical fiber, specifically to an optical fiber doped with a rare earth element and an optical fiber-type light amplifier (optical fiber amplifier).

2. Related Background Art

The light amplifier using an optical fiber doped with a rare earth element, e.g., erbium (Er) is characterized by little noise, and data transfer at high bit rates. Countries all over the world are studying and developing the optical fiber amplifier. Many results of these studies were presented in 1989 Optical Fiber conference held in Houston, U.S.A. in February, 1989. For example, Y. Kimura et al. presented "Efficient $Er^{+3}$-doped optical fiber amplifier pumped by a 1.48-$\mu$m high-power laser diode" which proved that a laser diode is used as a beam source for exciting (pumping) the Er doped in a quartz fiber, whereby the optical fiber amplifier can be miniaturized.

It is necessary that the optical fiber amplifier comprises in a package a pumping beam source, an Er-doped optical fiber, and an optical coupler for combining a signal beam and a pumping beam. The optical coupler is generally small-sized, and the pumping beam source can be miniaturized by using a laser diode. But the Er-doped optical fiber has to be, at the present, as long as 50-200 m, and it is difficult to house this optical fiber in a small package. This is because when the optical fiber is wound in loops to be compact, the optical fiber more tends to break off as the radius of curvature becomes smaller. When the optical fiber is wound in a number of loops, the loops of the Er-doped optical fiber are adjacent to one another, with the result that the optical fiber becomes unsuitable for high bit-rate transmission. The stimulated emission light of the Er ions excited in the optical fiber is given forth not only in the axial direction of the optical fiber but also in all directions and intrudes into the adjacent loops of the otpical fibers as leakage radiation. Resultantly the leakage radiation as well is amplified unsuitably for high bit-rate signal transfer.

This problem occurs not only with the optical fiber amplifier but also with the optical fiber laser oscillator. That is, to miniaturize the laser oscillator, needless to say it is necessary to wind the Er-doped optical fiber into small loops. In other words, to miniaturize the optical fiber-type optically active device, such as a light amplifier, a laser oscillator or others, it is necessary to prevent breakage of loops of the optical fiber and shut off leakage light.

A first object of this invention is to provide an optical fiber which is bendable at a small radius of curvature and can prevent the leakage of the stimulated emission light.

A second object of this invention is to provide an optically active device, such as an optical fiber amplifier, which is small-sized and can realize good optically active characteristics.

SUMMARY OF THE INVENTION

The optical fiber according to this invention is characterized in that at least the core is doped with an optically functioning element, and a cladding hermetically coated with carbon film.

The optical fiber optically active device according to this invention is characterized by comprising an optically functioning element-doped optical fiber loop bundle formed by winding several times an optical fiber hermetically coated with carbon film, a support member for supporting this optical fiber loop bundle, and beam introducing means for introducing a pumping beam into the optical fiber loop bundle for pumping the optically functioning element.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is a diagram of the durability of the Er-doped optical fiber coated with carbon;

DESCRIPTION OF THE PREFERRED EMBODIMENT

Figure 1A:
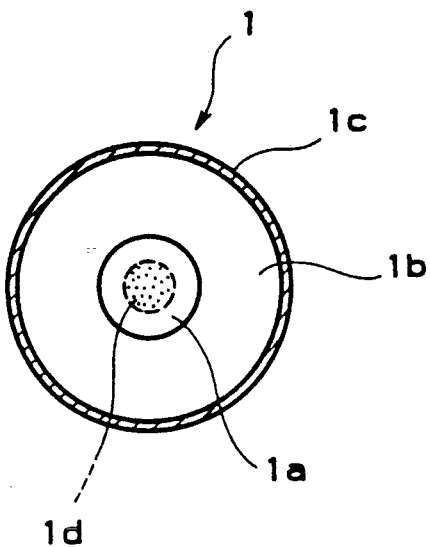
FIGS. 1A to 1C are view showing the structure of the optical fiber involved in an embodiment of this invention.
Figure 1B:
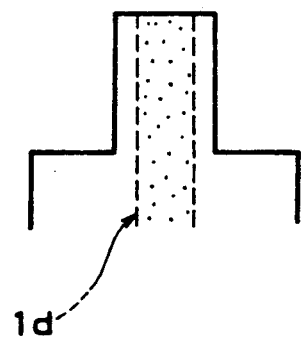
Figure 1C:
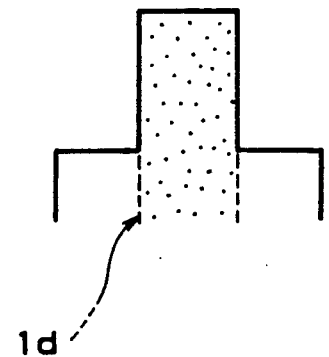

FIG. 1A is a sectional structure of the optical fiber according to an embodiment of this invention. As shown, an optical fiber 1 comprises a core 1a of a glass material with a higher refractive index, a cladding 1b of a glass material with a lower refractive index, and a carbon film 1c hermetically coating the outside of the cladding 1b. Only the central portion of the core 1a is doped with Er ions, and the stimulated emission is enabled by pumping the Er ions. FIG. 1B shows a distribution of the refractive indices of the optical fiber 1 of FIG. 1A, and a relationship of the Er-doped region 1d with the same. FIG. 1C shows an example where the Er-doped region 1d is spread all over the core 1a.

In both distributions of the Er ions of FIGS. 1B and 1C, the light amplification can be performed. Compared with each other, the case of FIGS. 1A and 1B generally has higher amplifying efficiency. This is because when the Er ions are excited, they much contribute to the light amplification by the stimulated emission, but when the Er ions are excited, they are merely a factor for causing light loss. Accordingly it is preferable that Er ions are not contained in the outer peripheral portion of the core 1a where the power of a pumping beam is relatively low. But this is not substantive matter, and the optical fiber with the portion of the cladding 1b near the core 1a Er ion-doped can be suitably used for the light amplification, etc. The ion to be doped is not limited to the rare earth elements ions, such as Er ions. That is, rare earth elements are most suitable as optically functioning elements to be doped, but transition metals or others may be used as long as they are pumped by a pumping beam and conduct stimulated emission at a different wavelength.

The hermetic coating of the carbon film 1c is conducted by the technique usually used for the quartz optical fiber. This technique is published in, e.g., R. G. Huff et al., "Amorphous Carbon Hermetically Coated Optical Fibers" (OFC 88/Tuesday Afternoon/23), and is disclosed in K. E. Lu, Hermetically Coated Optical Fiber and K. E. Lu, "Recent Developments in Hermetically Coated Optical Fiber" (Journal of Lightwave Technology, vol. 6, No. 2, February, 1988). This invention is an application of this hermetic coating technique to the rare earth-doped optical fiber and is not especially limited with respect to the raw material of the coating film and the thickness thereof.

The optical fiber according to the above-described embodiment functions as follows and produces the following advantageous effects. First, the physical break resistance of the optical fiber 1 bent in loops is improved. This is evident from the examples which will be described later. Second, the environmental resistance is improved. That is, the carbon film which is as thin as around hundreds angstrom (Å) has such a dense structure that it can be a protective film of the glass fiber comprising the core 1a and the cladding 1b, with the result of improved hydrogen resistance. Third, the carbon film 1c has light shielding property which suitably prevents the stimulated emission light from rare earth ions, such as Er ions, from leaking outside the optical fiber. The effect of this prevention of the leak light is significant because the stimulated emission light is radiated not only the axial direction of the optical fiber 1, but also in all directions. When the optical fiber is wound several times in a bundle of loops, this leak light adversely enters adjacent loops of the optical fiber 1. Thus, this prevention of the leak light produces the significant advantageous effects that noises are prevented, and high bit-rate communication becomes possible especially when the optical fiber 1 and a pumping beam source (e.g., a laser diode) constitute an optical fiber-type laser oscillator, or when an optical coupler for inputting a signal beam is added to the same to constitute an optical fiber amplifier.

Figure 2:
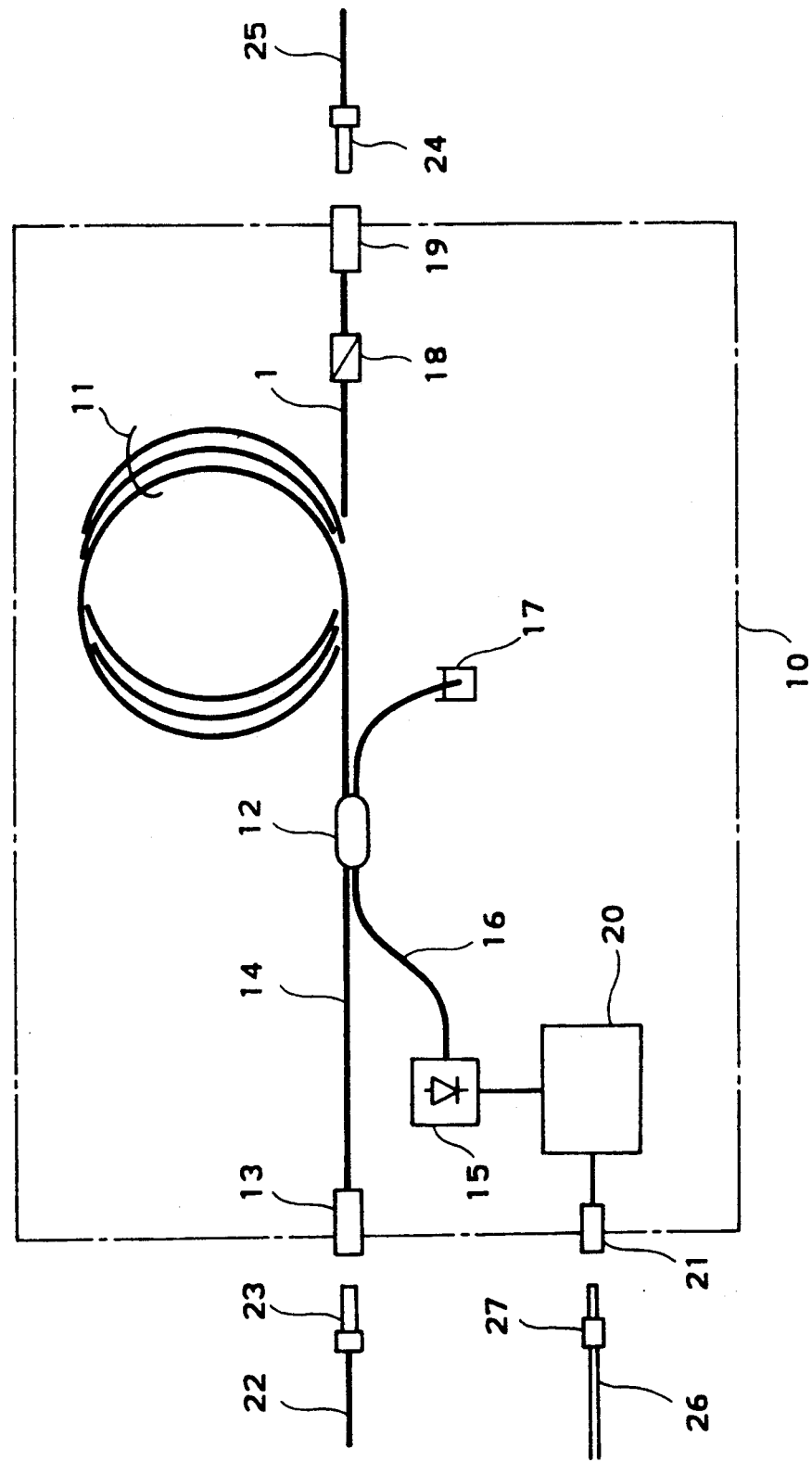
FIG. 2 is a diagram of the structure of the optical fiber amplifier according to an embodiment of this invention.

With reference to FIG. 2, an embodiment of the optical fiber amplifier will be explained. This light amplifier is encased by a package 10 indicated by the one-dot chain line in FIG. 2. An Er-doped optical fiber 1 is wound several times to form an optical fiber loop bundle 11 and is connected at one end optically to an optical fiber 14 for inputting a signal beam optically connected to an input connector 13 by an optical coupler 12, and to an optical fiber 16 for inputting a pumping beam optically connected to a laser diode 15. The optical coupler 12 is formed by heating to stretch parts of two optical fibers to melt-fuse each other. The optical fiber 16 has one end dipped in matching oil (silicone oil) 17 for the prevention of occurrence of return beams.

One end of the Er-doped optical fiber 1 constituting the optical fiber loop bundle 11 is optically connected to an output connector 19 through a filter or an optical part, e.g., an isolator 18, which prohibits the incidence of return beams from the output connector, etc. oppositely on the Er-doped optical fiber. The laser diode 15 is supplied with an emission drive power by a drive circuit 20, and the drive circuit 20 is supplied with a power by a power source 21.

A signal beam to be amplified is inputted from an optical fiber 22 of an optical communication cable outside the package 10 to the light amplifier through a optical connector 23 and the input connector. The amplified signal beam is outputted to an optical fiber 25 of the outside optical communication cable through an output connector 19 and an optical connector 24. A drive power is supplied by an outside power cable 26 through a power connector 17 and a power source connector 21. In this embodiment, the Er-doped optical fiber 1 of the optical fiber loop bundle 11 is coated with carbon film, and the optical fiber loop bundle 11 is held by a support member (not shown) secured to the package 10 so that the loops do not collapse.

Next, the operation of the optical fiber amplifier according to this embodiment will be explained. The laser diode 15 outputs a pumping beam of, e.e., a 1.48 μm(micron-meter)-wavelength, and the outside optical fiber 22 inputs a signal beam of e.g. a 1.55 μm-wavelength. Then the Er ions doped in the optical fiber loop bundle 11 are excited, and stimulated emission in the ranges of 1.53 μm and of 1.55 μm becomes possible. The signal beam of 1.55 μm is amplified and outputted. The 1.48 μm-wavelength pumping beam is cut by the filter or the optical part, e.g., the isolator 18, and only the 1.55 μm-wavelength signal beam is outputted. The optical fiber loop bundle 11, which comprises the carbon-coated optical fiber 1, does not break when miniaturized, and has such durability that allows for a long time use thereof. The leak light is shut off by the carbon film and does not intrude into the adjacent loops of the Er-doped optical fiber, with the result that a transmitted beam at a high-bit rate can be optically amplified.

Figure 3:
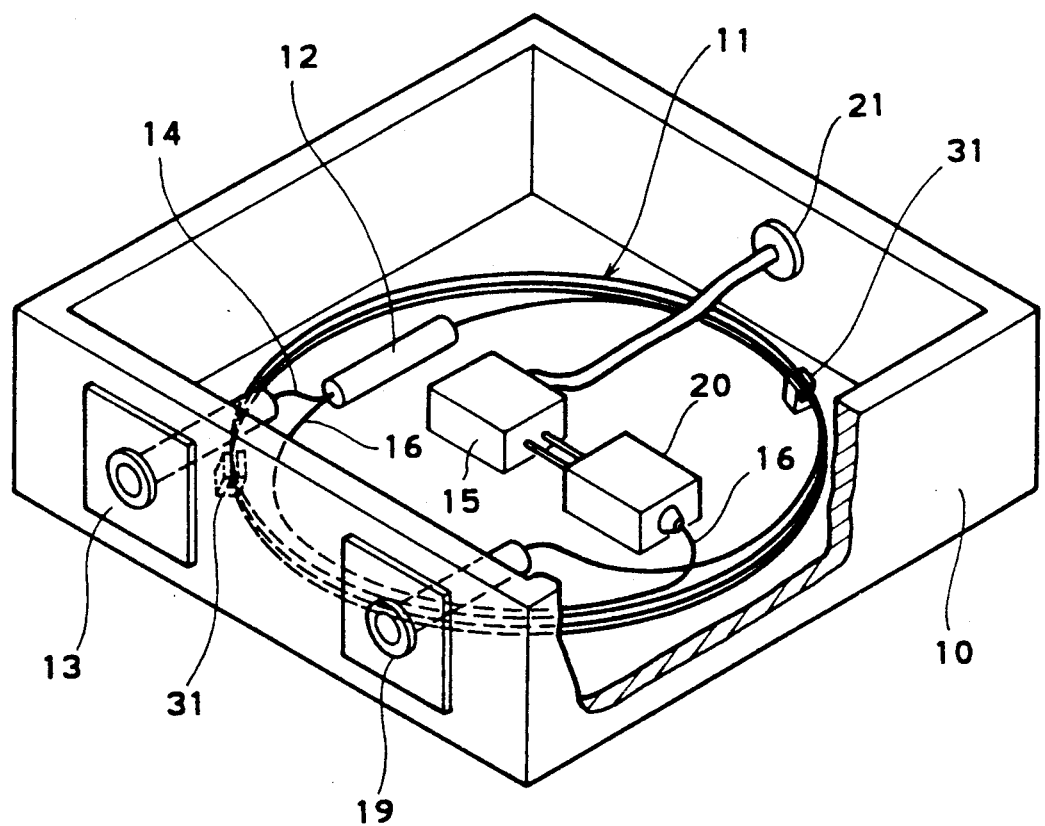
FIG. 3 is a perspective view of the optical fiber amplifier of FIG. 2 for showing the structure thereof.

FIG. 3 is a partially broken perspective view schematically showing the structure of the optical fiber amplifier of FIG. 2. As shown, the optical fiber loop bundle 11 of the carbon-coated optical fiber 1 is held by support projections 31 secured to the package 10.

Figure 4A:
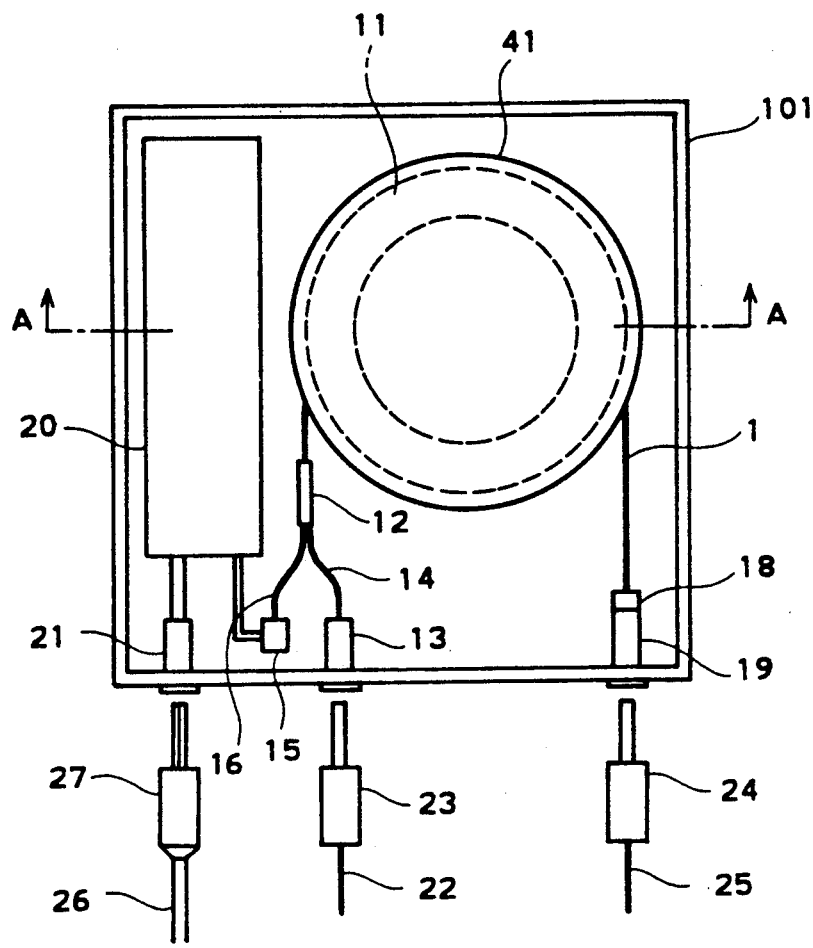
FIG. 4A is a plan view of the optical fiber amplifier according to another embodiment for showing the structure thereof.
Figure 4B:
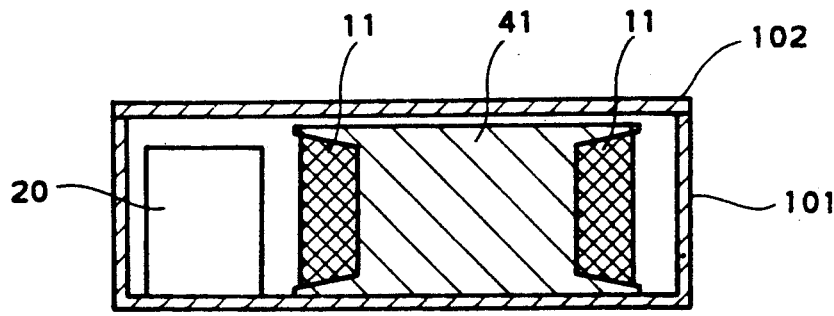
FIG. 4B is a sectional view along the line A—A of FIG. 4A.

FIGS. 4A and 4B shows the optical fiber-type light amplifier according to another embodiment. As shown, the package 10 comprises a body 101 and a lid 102. A bobbin 104 is secured to the body 101, and the Er-doped optical fiber 1 is wound around the bobbin 41 to thereby form the optical fiber loop bundle 11. This embodiment is common with the embodiment of FIG. 2 in the other members. The common members have the same reference numerals. In this embodiment, the optical fiber loop bundle 11 comprises the carbon-coated optical fiber 1, with the results that it is rare for the loops break in use, and a signal beam of high bit-rate can be amplified.

As another example of the optical-fiber-type optically active device, when an optical fiber-type laser oscillator, for example, is formed, the members for introducing a signal beam is omitted from the device of FIGS. 4A and 4B. That is, the input connector for inputting a signal beam 13 and the optical fiber 14 and the optical coupler 12 are omitted to form a Fabry-Perot resonator. This resonator can be formed by finishing both end surfaces of the optical fiber 1 constituting the optical fiber loop bundle 11 in mirrors, or by finishing the end surface of the optical fiber 1 on the side of the output connector 19 in a mirror and using this surface and the end surface of the laser diode 15.

The inventors prepared the optical fiber amplifier in which the outside dimensions of the package is 6 cm×6 cm×2 cm which is foldable on a hand, the optical fiber doped with a rare earth element has a length of 3 m and is wound in a diameter of 3 cm, and the thickness of the carbon film applied to the optical fiber 1 is 300 Å, and tested for its durability. FIG. 5 shows the test result. In FIG. 5, the column of durability shows a number of days the rare earth element-doped optical fiber required to break when the optical fiber amplifier was placed in corresponding surrounding atmospheres. The blank stars in this column indicate that the carbon-coated optical fiber did not break in two months of the test. This result shows that in comparison of the rare earth element-doped optical fiber coated with carbon with that non-coated with carbon, the former is superior to the latter in durability. Thus, the Er-doped optical fiber according to this invention, which is coated with carbon film, has improved mechanical strength and environmental durability.

Figure 6:
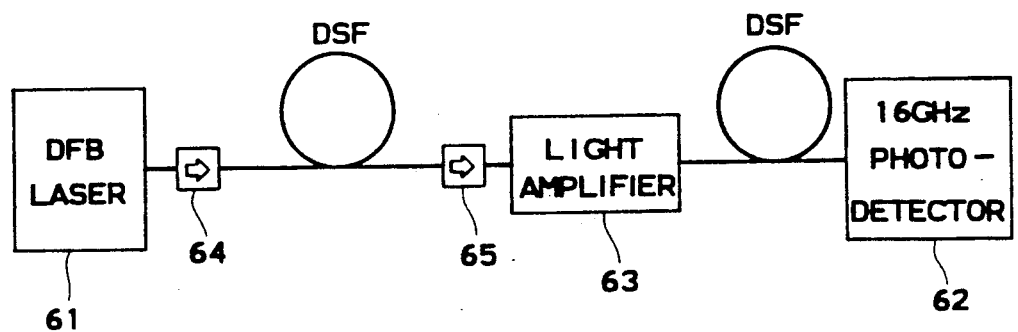
FIG. 6 is a diagrammatic view of the system used for the test.
Figure 7:
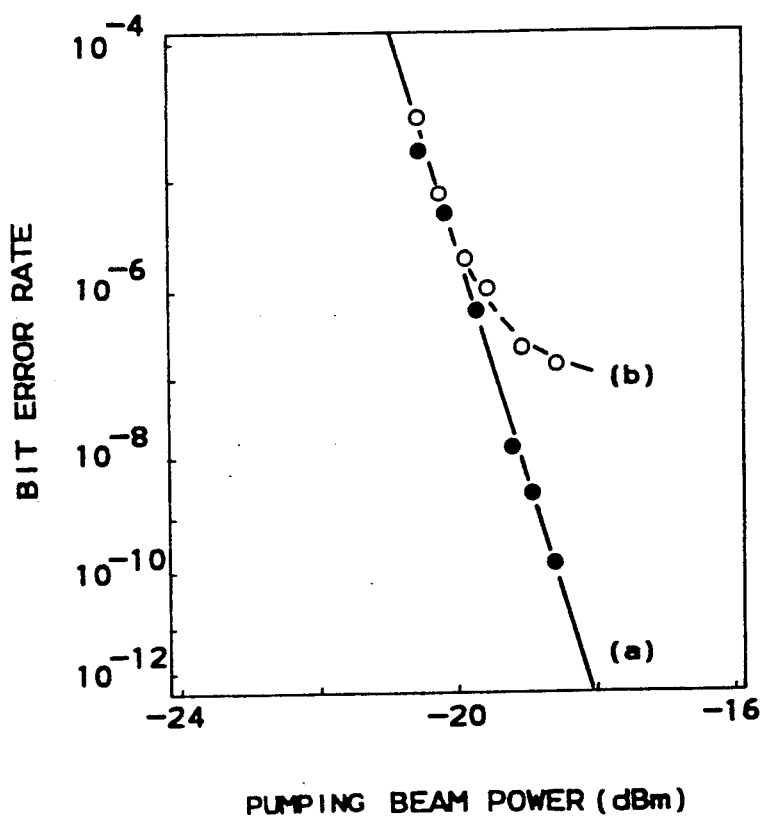
FIG. 7 is a graph showing the test result.

The following test was made for confirming the improvement of the bit error rate of the carbon-coated optical fiber according to this invention. As shown in FIG. 6, a DFB (distributed feedback) laser 61 of which oscillation frequency is 11 Giga-bit/sec., was used as a signal beam power source, and a photo detector 62 having a photo detecting band width of 16 GHz and comprising a pin-type photo-diode and a HEMT was used as a receiver. A light amplifier 63 had loops of 110 m of the optical fiber doped with 30 ppm of Er. The DFB laser 61 and the light amplifier 63 were interconnected by a 70 km-DS fiber through isolators 64, 65, and the light amplifier 63 and the photo detector 62 were interconnected by a 81 km-DS fiber. In this test system, as the Er-doped optical fiber built in the light amplifier 63, a carbon-coated Er-doped optical fiber and a non-carbon-coated Er-doped optical fiber were used to check their bit error rates. The results are as shown in FIG. 7. In FIG. 7, the line A indicates the case of with the carbon coating, and the line B indicates the case of without the carbon coating. In the case of without the carbon coating, even with the photo-detecting power increased, the improvement of the bit error rate stops, but in contrast to this, in the case of with the carbon coating, with the photo-detecting power increased, the improvement of the bit error rate reaches the order of $10^{-10}$.

In addition, the stimulated emission light given forth in directions other than the direction of the optical axis of the Er-doped optical fiber is absorbed by the carbon film and does not leak outside. In the optical fiber-type optically active device, the rare earth element-doped optical fiber has improved mechanical strength and suppressed static fatigue, with the result that the break of the optical fiber wound in loops is suppressed, which enables the optical fiber to be wound in loops of a small diameter to thereby miniaturize the optical fiber amplifier. In addition, it does not happen that the stimulated emission light intrudes the adjacent loops of the Er-doped optical fiber adversely to give forth noises.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical fiber comprising:
   a core having an optically functioning element doped therein;
   a cladding covering said core and extending in a longitudinal direction of said core; and
   means for preventing light from leaking from said cladding, said preventing means including a light shielding film formed of carbon hermetically coated on said cladding in said longitudinal direction;
   wherein said core of said optical fiber is doped so that when an input light, having a first wavelength, and a pumping light, having a second predetermined wavelength, are introduced into said optical fiber, the input light is amplified by the optically functioning element, said first wavelength being greater than said second predetermined wavelength, said second predetermined wavelength being selected, based on the composition of said optically functioning element, to cause said amplification; and
   wherein said amplified input light being output at a wavelength the same as that of the input light.

2. An optical fiber according to claim 1, wherein the optically functioning element is a rare earth element.

3. An optical fiber-type optically active device, comprising:
   an optical fiber loop bundle having a plurality of winds of an optical fiber, said optical fiber including:
   a core having an optically functioning element doped therein;
   a cladding covering said core and extending in a longitudinal direction of said core; and
   means for preventing light from leaking from said cladding, said preventing means including a light shielding film formed of carbon hermetically coated on said cladding in said longitudinal direction;
   wherein said core of said optical fiber is doped so that when an input light, having a first wavelength, and a pumping light, having a second predetermined wavelength, are introduced into said optically functioning element, the input light is amplified by the optically functioning element, said first wavelength being greater than said second predetermined wavelength, said second predetermined wavelength being selected, based on the composition of said optically functioning element, to cause said amplification; and
   wherein said amplified input light being output at a wavelength the same as that of the input light; and
   means for introducing said pumping light into the optical fiber loop bundle so that said pumping light pumps the optically functioning element.

4. A device according to claim 3, wherein the optically functioning element is a rare earth element.

5. A device according to claim 3 further comprising a support member for holding the optical fiber loop bundle.

6. A device according to claim 5, wherein the support member is a bobbin secured to a package, and the optical fiber loop bundle is provided by the optical fiber wound on the bobbin.

7. A device according to claim 3, wherein the beam introducing means has a laser diode optically connected to the optical fiber.

8. An optical fiber optically active device, comprising:
- an optical fiber loop bundle including a plurality of winds of an optical fiber, said optical fiber being hermetically coated with carbon and doped with an optically functioning element;
- a beam source for optically pumping the optically functioning element doped in the optical fiber;
- means for introducing a pumping beam from the beam source into the optical fiber loop bundle; and
- means for introducing a signal beam into the optical fiber loop bundle.

9. A device according to claim 8, wherein the optically functioning element is a rare earth element.

10. A device according to claim 8 further comprising a support member for holding the optical fiber loop bundle.

11. A device according to claim 10, wherein the support member is a bobbin secured to a package, and the optical fiber loop bundle is provided by the optical fiber wound on the bobbin.

12. A device according to claim 8, wherein the beam source has a laser diode optically connected to the optical fiber.

13. A device according to claim 8, wherein the optical fiber loop bundle has one end optically connected to the introducing means and the other end optically connected to an output connector through means for selectively prohibiting the pumping beam and passing the signal beam.

* * * * *